US010219434B2

(12) United States Patent
Roure

(10) Patent No.: US 10,219,434 B2
(45) Date of Patent: Mar. 5, 2019

(54) DEVICE AND METHOD FOR DREDGING A WATERCOURSE OR BODY OF WATER, BAG FOR PLANT MATTER, AND METHOD FOR STORING PLANT MATTER

(71) Applicant: GÉCO INGÉNIERIE, Laudun L'ardoise (FR)

(72) Inventor: Frédéric Roure, Laudun L'ardoise (FR)

(73) Assignee: GÉCO INGÉNIERIE, Laudun L'ardoise (FR)

( * ) Notice: Subject to any disclaimer, the term of this patent is extended or adjusted under 35 U.S.C. 154(b) by 33 days.

(21) Appl. No.: 15/328,044

(22) PCT Filed: Jul. 23, 2015

(86) PCT No.: PCT/EP2015/066834
§ 371 (c)(1),
(2) Date: Jan. 22, 2017

(87) PCT Pub. No.: WO2016/012529
PCT Pub. Date: Jan. 28, 2016

(65) Prior Publication Data
US 2017/0208743 A1 Jul. 27, 2017

(30) Foreign Application Priority Data

Jul. 23, 2014 (FR) ...................................... 14 57119
Jul. 23, 2014 (FR) ...................................... 14 57121

(51) Int. Cl.
*A01D 44/00* (2006.01)
*B65D 65/46* (2006.01)
*E02F 5/00* (2006.01)

(52) U.S. Cl.
CPC ........... *A01D 44/00* (2013.01); *B65D 65/466* (2013.01); *E02F 5/006* (2013.01)

(58) Field of Classification Search
CPC . A01D 44/00; A01D 44/02; E02F 5/00; E02F 5/006; B65D 65/46; B65D 65/38; B65D 65/466
(Continued)

(56) References Cited

U.S. PATENT DOCUMENTS 1,120,206 A * 12/1914 Knapp ................... A01D 44/00
114/255
3,498,033 A 3/1970 Huff
(Continued)

FOREIGN PATENT DOCUMENTS

FR 2276773 A1 1/1976
FR 2700240 A1 7/1994
(Continued)

OTHER PUBLICATIONS

International Search Report of the ISA (EPO) dated Oct. 5, 2015.

*Primary Examiner* — Robert E Pezzuto
(74) *Attorney, Agent, or Firm* — Patshegen IP; Moshe Pinchas

(57) ABSTRACT

The invention relates to a device (10) for dredging a watercourse or body of water, the device includes a watercraft (105) which supports a grinder, the grinder (110) for grinding plants found in the watercourse or body of water comprising an inlet (115) for plants and an outlet (120) for ground plants, and a floating receptacle (125) which is connected to the outlet of the grinder in order to collect the scraps of ground plants.

18 Claims, 3 Drawing Sheets

(58) Field of Classification Search
USPC .......................................................... 56/8, 9
See application file for complete search history.

(56) References Cited

U.S. PATENT DOCUMENTS

| | | | | |
|---|---|---|---|---|
| 3,691,737 | A * | 9/1972 | Hodgson | A01D 44/00 56/9 |
| 3,866,396 | A * | 2/1975 | Meyer | A01D 44/00 56/9 |
| 3,884,018 | A | 5/1975 | Chaplin | |
| 4,261,160 | A * | 4/1981 | Niewiera | A01D 44/00 56/8 |
| 4,999,982 | A | 3/1991 | Kriger | |
| 5,142,849 | A | 9/1992 | Amimoto | |
| 5,338,131 | A | 8/1994 | Bestmann | |
| 5,487,258 | A * | 1/1996 | McNabb | A01D 44/00 56/9 |
| 7,958,705 | B1 * | 6/2011 | Bourque | A01D 44/00 56/8 |
| 2003/0154702 | A1 | 8/2003 | Castleberry | |
| 2006/0021311 | A1 * | 2/2006 | Kim | A01G 20/30 56/1 |
| 2009/0266767 | A1 * | 10/2009 | McInnis | C02F 1/42 210/688 |
| 2010/0089016 | A1 | 4/2010 | Grimes | |
| 2014/0069071 | A1 * | 3/2014 | Horton | A01D 44/00 56/9 |

FOREIGN PATENT DOCUMENTS

| | | |
|---|---|---|
| FR | 2972462 A1 | 9/2012 |
| GB | 2073568 A | 10/1981 |
| WO | 2004017715 A1 | 3/2004 |

\* cited by examiner

DEVICE AND METHOD FOR DREDGING A WATERCOURSE OR BODY OF WATER, BAG FOR PLANT MATTER, AND METHOD FOR STORING PLANT MATTER

TECHNICAL FIELD OF THE INVENTION

The present invention relates to a device and method for dredging a watercourse or body of water, a bag for plant matter, and a method for storing plant matter. It applies, in particular, to dredging watercourses or bodies of water.

STATE OF THE ART

Natural or artificial watercourses make it possible to limit the risks of ground being flooded, by having surplus local rainwater flow into progressively larger watercourses or bodies of water that allow this surplus to be stored.

These watercourses carry sediment as well as water, gradually causing them to silt up. In particular, this natural phenomenon is stronger in geographic areas with a flat topography, where the ground is especially susceptible to erosion, or in slowly-flowing watercourses. There can also be industrial and urban effluent in addition to this natural sediment.

Furthermore, invasive plants can grow in the watercourses, restricting the water's flow capacity. These invasive plants can also be a threat to the biodiversity of the watercourse. These plants are, for example, Jussies (*Ludwigia* sp.), Dense waterweed (*Egeria densa*), Elodea (*Elodea* sp.), Lagarosiphon (*Lagarosiphon major*) and Brazilian Milfoil (*Myriophyllum aquaticum*). Uprooting these plants, as carried out in current systems, is insufficient to restrict their expansion.

In order to restore and maintain the flow capacity of watercourses and reduce the impact of invasive plants on the biodiversity, it is necessary to carry out a dredging operation, which consists of removing the sediment and plants from these watercourses.

In some current systems, a tractor shovel extracts the sediment and plants from the watercourse and feeds a bag made of woven synthetic material, this bag normally being abandoned on a bank once the dredging operation has been carried out.

These systems do not allow the amount of invasive plants present in the watercourse to be durably reduced. Secondly, these systems have a bad ecological footprint because synthetic materials, in particular plastic, are left in a nature area.

SUBJECT OF THE INVENTION

The present invention aims to remedy all or part of these drawbacks.

To this end, according to a first aspect, the present invention envisages a bag for plant matter, which comprises:
- a meshing made of geotextile for holding the plant matter, this meshing being configured to be rolled up to form a tube comprising, at one extremity, an inlet for the plant matter;
- a means for maintaining the meshing in the rolled-up position; and
- a means for closing the other extremity of the tube.

Thanks to these provisions, the bag, which can be rolled up and unrolled, allows plant matter to be collected when the bag is rolled up.

Another problem of systems of prior state of the art is that bags made of synthetic material are left in place once filled, which is harmful for the environment.

In some embodiments, the bag that is the subject of the present invention comprises a means for unrolling the bag, at least partially filled with plant matter, to extract the plant matter.

These embodiments allow the plant matter contained in the bag to be released when the bag is unrolled. In this way, the bag can be reused and the ecological footprint of using the bag is reduced.

In some embodiments, the unrolling means comprises at least one band made of thermoplastic polymer.

The advantage of these embodiments is that the bands made of thermoplastic polymer are very solid, which makes it possible to exert a significant traction force on these bands to unroll the bag when this bag is filled with plant matter.

In some embodiments, the meshing comprises at least one portion made of non-woven vegetable fiber.

These embodiments reduce the ecological footprint linked with manufacturing and exploiting the bag.

In some embodiments, the meshing comprises at least one portion made of non-woven hemp fiber.

These embodiments reduce the ecological footprint linked with manufacturing and exploiting the bag, as well as reducing the cost of manufacturing the bag.

In some embodiments, the meshing is configured to withstand a plant matter input pressure higher than eight bar.

The advantage of these embodiments is that they allow plant matter to be projected powerfully into the bag to facilitate filling a long bag, for example.

In some embodiments, the bag that is the subject of the present invention comprises a means for floating on an area of water.

These embodiments allow the bag to be moved over an area of water during the dredging of a watercourse, for example.

In some embodiments, the bag that is the subject of the present invention comprises a means for fastening to a means for moving the bag filled, at least partially, with plant matter.

The advantage of these embodiments is that they allow the bag filled with plant matter to be moved from a watercourse, for example, to a hard surface near the watercourse.

According to a second aspect, the present invention envisages a method for storing plant matter, which comprises:
- a step of rolling up a bag that is the subject of the present invention;
- a step of positioning the bag in a watercourse or body of water;
- a step of dredging a watercourse or body of water, comprising a step of grinding plant matter, and a step of feeding the inlet of the bag with this plant matter;
- a step of extracting the bag from the watercourse or body of water;
- a step of depositing the bag on a hard surface; and
- a step of unrolling the bag to release the plant matter held in the bag onto the hard surface.

As the aims, advantages and features of the method that is the subject of the present invention are similar to those of the device that is the subject of the present invention, they are not repeated here.

According to a third aspect, the present invention relates to a device for dredging a watercourse or body of water, which comprises:
- a watercraft which carries a grinder;

the grinder for grinding plants present in the watercourse or body of water comprising an inlet for plants and an outlet for ground plants; and a floating bag that is the subject of the present invention, connected to the outlet of the grinder in order to collect scraps of ground plants.

Thanks to these provisions, the device can dredge any watercourse or body of water that can be navigated by the watercraft. In addition, grinding plants means plant matter can be stored more densely, which makes it possible to reduce the dimensions of the bag, or receptacle.

In some embodiments, the device that is the subject of the present invention comprises a means for sucking up plants, configured to feed the inlet of the grinder with the plants sucked up.

These embodiments facilitate the feeding of plants to the grinder by sucking up the plants near the device.

In some embodiments, the device that is the subject of the present invention comprises a means, immersed in the watercourse or body of water, for sectioning stems of plants to be ground.

The advantage of these embodiments is that they facilitate the feeding of plants to the grinder by avoiding having submersed plants remaining out of the reach of the grinder.

In some embodiments, the device that is the subject of the present invention comprises a means for sterilizing seeds ground together with the plants and having passed through the grinder.

These embodiments restrict the seeds' ability to proliferate so as to prevent the plants proliferating once the ground plant matter is extracted from the bag or in the bag.

In some embodiments, the bag made of geotextile comprises at least one portion made of vegetable fibers.

The advantage of these embodiments is that they allow the ecological footprint of the bag to be reduced in the case where the bag is placed on a bank once it is filled with plant material.

In some embodiments, the bag comprises at least one portion made of non-woven hemp.

These embodiments enable low-cost installation of the bag, and improve its ecological footprint.

In some embodiments, the device that is the subject of the present invention comprises a means for loosening sediment fixed to a side of the watercourse or body of water.

The advantage of these embodiments is that they allow the roots of plants fixed in the sediment to be ground.

According to a fourth aspect, the present invention relates to a method of dredging a watercourse or body of water, which comprises:

a step of grinding plants present in the watercourse or body of water by a grinder carried by a watercraft; and a step of collecting scraps of ground plants in a floating bag connected to the grinder.

As the aims, advantages and features of the method that is the subject of the present invention are similar to those of the device that is the subject of the present invention, they are not repeated here.

In some embodiments, the method that is the subject of the present invention comprises, prior to the grinding step, a step of sucking up plants.

These embodiments facilitate the feeding of plants to the grinder by sucking up the plants near the device.

In some embodiments, the method that is the subject of the present invention comprises a step of sectioning stems of plants to be ground.

The advantage of these embodiments is that they facilitate the feeding of plants to the grinder by avoiding having submersed plants remaining out of the reach of the grinder.

BRIEF DESCRIPTION OF THE FIGURES

Other advantages, aims and particular features of the invention will become apparent from the non-limiting description that follows of at least one particular embodiment of the device and method that are the subjects of the present invention, with reference to drawings included in an appendix, wherein.

DESCRIPTION OF EXAMPLES OF REALIZATION OF THE INVENTION

The present description is given as a non-limiting example.

For the rest of the document, the term "geotextile" will refer to a fabric, generally made of synthetic material, configured to let water pass.

Advantageously, the embodiments described below can be combined.

Figure 1:
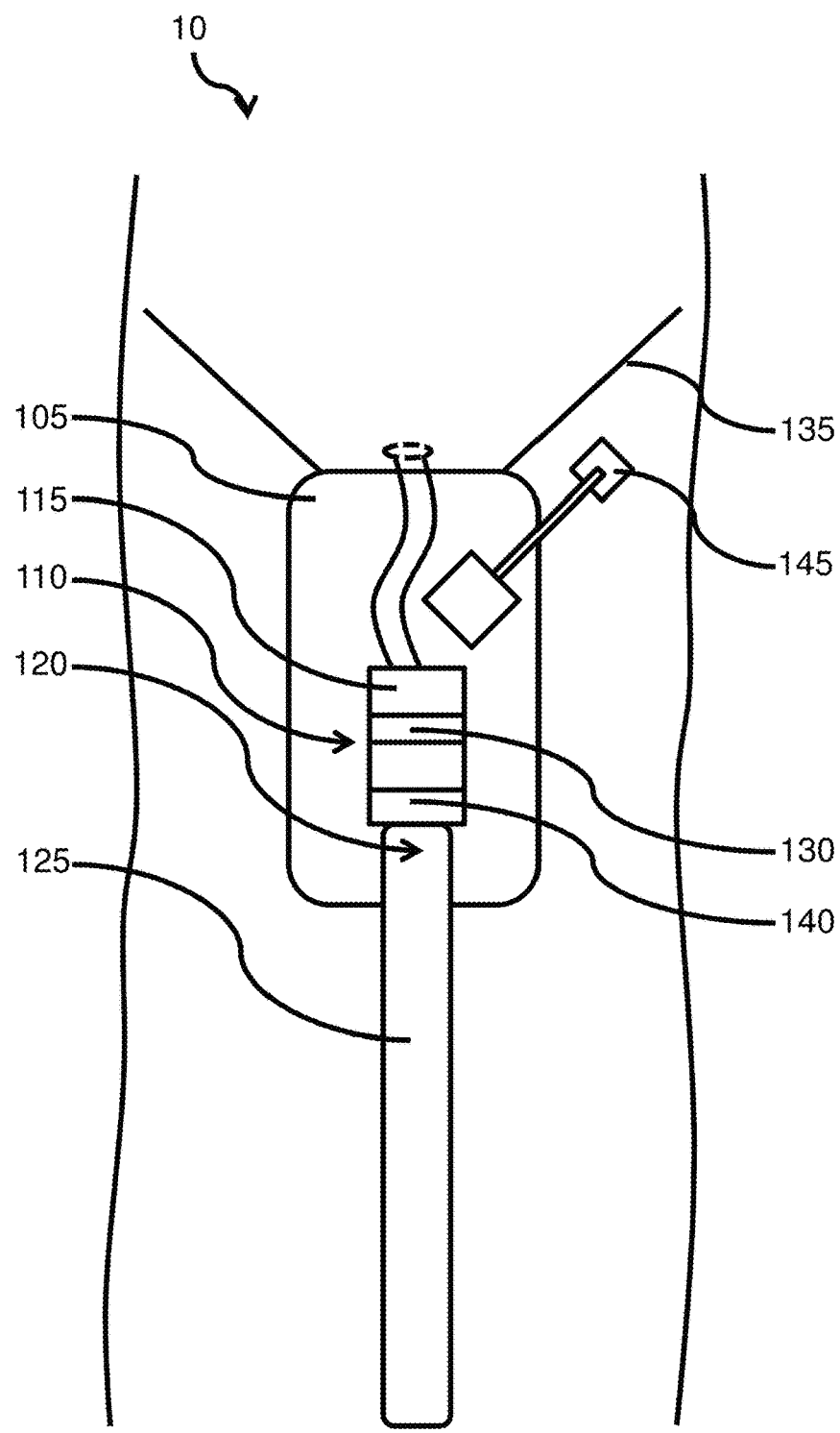
FIG. 1 represents, schematically, in a top view, a particular embodiment of the device that is the subject of the present invention.

FIG. 1, which is not to scale, shows a cross-section view of an embodiment of the device 10 that is the subject of the present invention. This device 10 for dredging a watercourse or body of water comprises:

a watercraft 105 which carries a grinder;

the grinder 110 for grinding plants found in the watercourse or body of water comprising an inlet 115 for plants and an outlet 120 for ground plants;

a means 135, immersed in the watercourse or body of water, for sectioning stems of plants to be ground;

a means 145 for loosening sediment fixed to a side of the watercourse or body of water;

a means 130 for sucking up plants, configured to feed the inlet 115 of the grinder 110 with the plants sucked up;

a means 140 for sterilizing seeds ground together with the plants and having passed through the grinder 110; and a floating receptacle 125, which is connected to the outlet of the grinder in order to collect the scraps of ground plants.

The watercraft 105 is, for example, a motor boat comprising an electrical power supply source for the rest of the device 10. This electrical power supply can be generated by the operation of the motor of the watercraft 105 or by a stand-alone power supply mounted on the watercraft 105, such as, for example, a cell or a battery.

The grinder 110 comprises, for example, a motorized rotating portion coupled to the suction means 130, the motorized rotating portion being equipped with blades, mounted on a rotating shaft set in motion by a hydraulic motor. This grinder allows the cutting up and back-flushing of the matter sucked into the inlet 115 for plants. The blades are mounted, for example, on the motorized rotating portion, which rotates in front of an opening of the suction means 130. In some variants, the activation of the suction means 130 causes the activation of the grinder 110. In other variants, the suction means 130 and the grinder 110 are controlled independently. The blades are set in rotation, for example, by a hydraulic motor.

The sectioning means 135 is, for example, a blade fixed to a blade mount, this blade mount being mobile. The device 10 comprises a means for positioning the blade mount so as to immerse the blade mount in the watercourse or body of water to be treated. In some variants, the sectioning means 135 comprises two blades, each supported by a blade mount. These blade mounts are positioned such that, when the watercraft 105 advances over a watercourse, the blades cover at least half the width of the watercourse.

The loosening means 145 is, for example, a rubber or metal blade, obliquely oriented to the bottom of the bed of the watercourse or body of water. This blade makes it possible to suspend the sediment fixed to the bottom of the bed of the watercourse or body of water and pulled off by the passage of the blade set in motion by the watercraft 105. In the case of a joint mount for the loosening means 145 and sectioning means 135, the loosening means 145 can be connected to the sectioning means 135 by a support arm.

In some variants, this loosening means 145 is an assembly of nozzles configured to spray water, which has been sucked up from the watercourse or body of water, under pressure onto the bottom of the bed ahead of a rigid blade for retrieving suspended sediment.

In some preferred embodiments, the device 10 comprises a means for retrieving cut plants and suspended sediment feeding the suction means 130. This retrieval means is formed, for example, of two arms oriented towards the front of the watercraft 105 to direct the cut plants and the sediment towards the suction means 130, one inlet of which is positioned between the two arms.

The suction means 130 is, for example, a hydraulic pump configured to suck up water, plants and sediment near an opening at least partially immersed in the watercourse or body of water. The matter sucked up enters into the grinder 110. The ground matter is evacuated by an outlet 120 of the grinder 110. In some variants, this suction means 130 has a suction flow of 430 m$^3$ per hour.

The material output from the grinder 110 passes through the sterilization means 140. This sterilization means 140 is, for example, a microwave oven configured to irradiate the seeds output from the grinder 110.

The suction means 130 also serves as a means for ejecting ground material into the receptacle 125.

The receptacle 125 is, for example, a bag made of geotextile comprising at least one portion made of vegetable fibers. One embodiment of such a bag is described in particular with regard to FIG. 3. These vegetable fibers are, for example, non-woven hemp.

This geotextile made of vegetable fibers comprises, for example:
  crushed vegetation stems having a diameter of more than five millimeters,
  vegetation stem fragments and
  vegetable fibers partially attached to the crushed stems, the stems and stem fragments being interwoven by means of mechanical links produced by spraying water.

This geotextile 115 is produced, for example, by utilizing a method comprising:
  a step of arranging vegetation into a mat of crushed vegetation with a diameter greater than five millimeters, vegetation stem fragments, and raw vegetable fibers partially attached to the crushed stems; and
  a step of spraying water onto the mat to form mechanical links between the crushed vegetation stems, the vegetation stem fragments, and the vegetable fibers of the mat.

This method comprises, for example:
  a step of introducing vegetation in the form of large-size vegetation, such as stems up to 2.5 meters in length, for example;
  a step of partially reducing the vegetation into stems to form stem elements preferably over twenty centimeters long, and preferably over fifty centimeters long;
  a step of crushing vegetation to form a mat of crushed vegetation with a diameter greater than five millimeters, vegetation stem fragments, and raw vegetable fibers partially attached to the crushed stems;
  a step of pointing stems and/or fibers in different directions;
  a step of making the thickness of the fiber mat uniform;
  a step of incorporating ropes or cables into the fibers, parallel to the length of the fiber mat;
  a step of creating mechanical links between the fibers of the mat, in the depth of the mat, by spraying water under pressure onto the vegetable fibers or, in a variant, with a multi-needle quilting machine.

The vegetation material used for implementing this method is, for example, a set of hemp fibers.

This receptacle 125 is configured to float, even when full, on the watercourse or body of water, due to the composition of this receptacle 125. In some variants, this receptacle 125 comprises floats.

Figure 2:
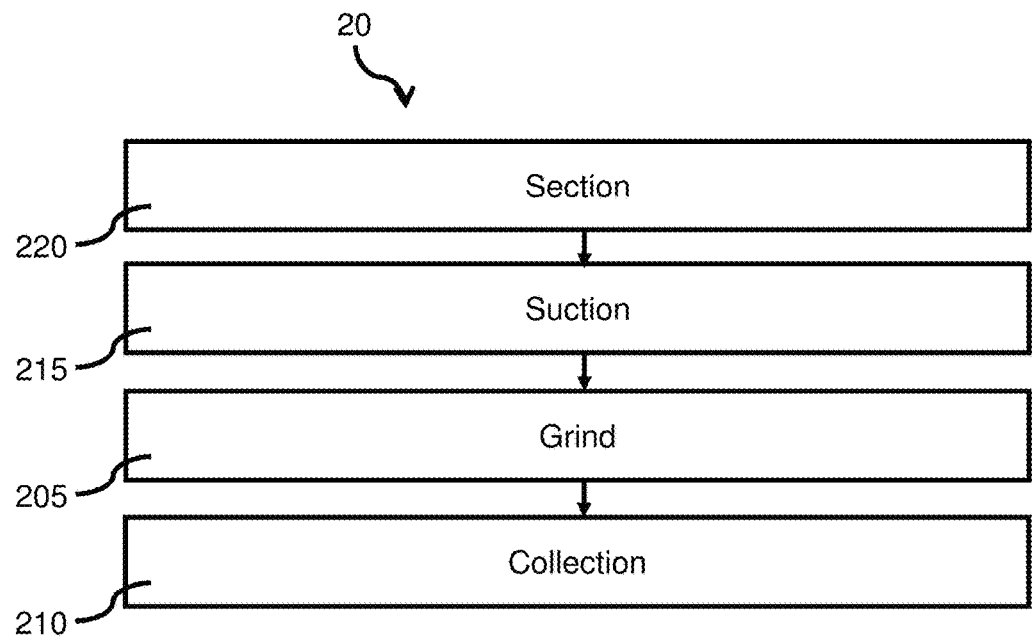
FIG. 2 represents, schematically, a logical diagram of particular steps of the method that is the subject of the present invention.

FIG. 2 shows a logical diagram of particular steps of the method 20 that is the subject of the present invention. This method 20 of dredging a watercourse or body of water comprises:
  a step 220 of sectioning stems of plants to be ground;
  a step 215 of sucking up plants;
  a step 205 of grinding plants present in the watercourse or body of water by a grinder carried by a watercraft; and
  a step 210 of collecting scraps of ground plants in a floating receptacle connected to the grinder.

The step 220 of sectioning stems of plants to be ground is carried out, for example, by a sectioning means 135 as described with regard to FIG. 1.

The suction step 215 is carried out, for example, by a suction means 130 as described with regard to FIG. 1.

The grinding step 205 is carried out, for example, by a grinder 110 as described with regard to FIG. 1.

The collection step 210 is carried out, for example, by a receptacle 125 as described with regard to FIG. 1.

Figure 3:
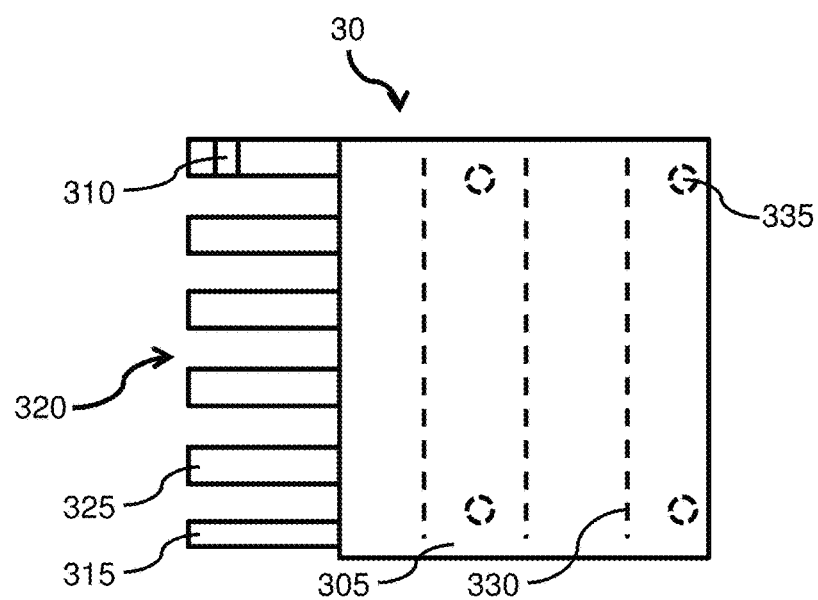
FIG. 3 represents, schematically, in a top view, a particular embodiment of the bag that is the subject of the present invention.

FIG. 3 shows a particular embodiment of the bag 30 that is the subject of the present invention. This bag 30 for plant matter comprises:
  a meshing 305 made of geotextile for holding the plant matter, this meshing being configured to be rolled up to form a tube comprising, at one extremity, an inlet for the plant matter;
  a means 310 for maintaining the meshing in the rolled-up position;
  a means 315 for closing the other extremity of the tube;
  a means 320 for unrolling the bag at least partially filled with plant matter so as to extract the plant matter, which comprises at least one band 325 made of thermoplastic polymer;
  a means 330 for floating on an area of water; and a means 335 for fastening to a means for moving the bag filled, at least partially, with plant matter.

The meshing 305 made of geotextile is, for example, a tarpaulin made of synthetic material comprising at least one portion made of non-woven vegetable fiber. This vegetable fiber is, for example, fiber made of non-woven hemp. This flexible tarpaulin is rectangular such that, once this rectangle is rolled up, the tarpaulin adopts a tubular shape initially open at two extremities after rolling up. One of the extremities is folded and closed by the closing means 315 to form a bag from the tube. This closing means 315 is, for example, a strap made of self-gripping fabric positioned by a user to be rolled around the tube and tighten the extremity to be closed. In some variants, this closing means 315 is an assembly of hooks linked to elastic bands rolled around the tube and fastened to eyes on the meshing 305.

The meshing 305 is configured to withstand a plant matter input pressure higher than eight bar. Preferably, the input pressure is ten bar.

In some preferred variants, a secondary meshing made of biodegradable geotextile is rolled up inside the meshing 305 once this meshing 305 is rolled up, such that the secondary meshing adopts the tubular shape of the meshing 305.

The purpose of this meshing 305 is to hold the input plants by allowing a liquid phase, mainly comprised of water, to leave the meshing 305. The purpose of the secondary meshing is to hold the dried plants in shape once the meshing 305 is unrolled. This secondary meshing, biodegradable in the same way as the matter contained, allows the ecological footprint of the device 30 to be limited.

The tube formed by the rolled-up meshing 305 is held in this position by the means of maintaining 310. This means of maintaining 310 is, for example, a means for fastening one portion of the meshing 305 to another portion of the meshing 305, such as a set of hooks, on the one hand, and eyes, on the other hand, for example.

The unrolling means 320 is, for example, a set of bands 325 made of thermoplastic polymer, such as Kevlar (registered trademark) for example, attached to one side of the meshing 305. When traction is exerted on this unrolling means 320, the tube formed by the meshing 305 is unrolled mechanically.

The flotation means 330 is, for example, an assembly of floats positioned along the meshing 305.

The fastening means 335 is, for example, an assembly of eyes allowing hooks to be attached, for example, these hooks being attached to a machine moving the bag from a watercourse towards a hard surface near the watercourse.

Figure 4:
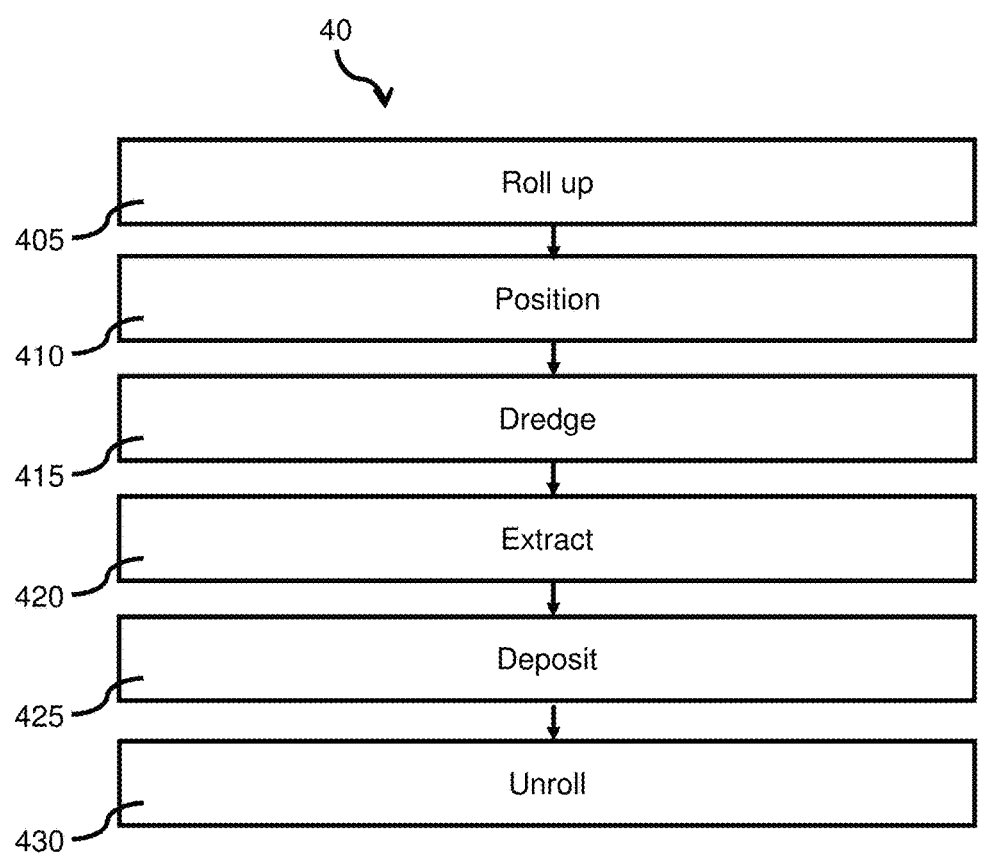
FIG. 4 represents, schematically, a logical diagram of particular steps of the method that is the subject of the present invention.

FIG. 4 shows a logical diagram of particular steps of the method 40 that is the subject of the present invention. This method 40 for storing plant matter comprises:
- a step 405 of rolling up a bag as described with regard to FIG. 3;
- a step 410 of positioning the bag in a watercourse or body of water;
- a step 415 of dredging a watercourse or body of water, comprising a step of grinding plant matter, and a step of feeding the inlet of the bag with this plant matter;
- a step 420 of extracting the bag from the watercourse or body of water;
- a step 425 of depositing the bag on a hard surface; and
- a step 430 of unrolling the bag to release the plant matter held in the bag onto the hard surface.

The rolling-up step 405 is carried out, for example, by a user folding the meshing of the bag to create a smooth tube shape closed at one extremity.

The step of positioning 410 the bag in a watercourse is carried out, for example, by attaching the bag to a watercraft comprising a grinder, such that the inlet of the bag is connected to the outlet of the grinder. When the watercraft advances in the watercourse, the bag is drawn into the watercourse and floats on the surface of this watercourse.

The dredging step 415 is carried out, for example, by the device 10 described with regard to FIG. 1, wherein the receptacle described is the bag.

The step of extracting 420 the bag is carried out, for example, by fastening hooks to the bag, enabling the bag to be pulled, by a machine, from the bed of the watercourse or body of water. In some variants, the extraction 420 is carried out by pulling the watercraft out of the water, the watercraft drawing the bag out of the water.

The depositing step 425 is carried out, for example, by removing the fastenings used to remove the bag from the watercourse of body of water.

The unrolling step 430 is carried out after a period of drying the bag, for example. During this unrolling step 430, traction is exerted on bands made of thermoplastic polymer such that the bag is unrolled and the content of the bag is turned out onto the hard surface.

The invention claimed is:

1. Bag for plant matter, comprising:
   a meshing made of geotextile for holding the plant matter, this meshing presenting a rectangular shape and being configured to be rolled up to form a tube the axis of the tube being parallel to two sides or the rolled up rectangle comprising, at one extremity, an inlet for the plant matter;
   a maintainer for maintaining the meshing in the rolled-up position by fastening one position of the meshing to another portion of the meshing; and
   a shutter for closing the other extremity of the tube by fastening one position of the meshing to another portion of the meshing.

2. Bag according to claim 1, which comprises a controller for unrolling the bag at least partially filled with plant matter so as to extract the plant matter.

3. Bag according to claim 2, wherein the controller comprises at least one band made of thermoplastic polymer.

4. Bag according to claim 1, wherein the meshing comprises at least one portion made of non-woven vegetable fiber.

5. Bag according to claim 4, wherein the meshing comprises at least one portion made of non-woven hemp fiber.

6. Bag according to claim 1, wherein the meshing is configured to withstand a plant matter input pressure higher than eight bar.

7. Bag according to claim 1, which comprises a floater for floating on an area of water.

8. Bag according to claim 1, which comprises a fastener for fastening to a means for moving the bag filled, at least partially, with plant matter.

9. Method of dredging a watercourse or body of water, comprising:
   a step of grinding plants present in the watercourse or body of water by a grinder carried by a watercraft; and
   a step of collecting scraps of ground plants in a a bag connected to the grinder;
   wherein said bag includes a meshing made of geotextile for holding the plant matter, the meshing presenting a rectangular shape and being configured to be rolled up to form a tube the axis of the tube being parallel to two sides or the rolled up rectangle comprising, at one extremity, an inlet for the plant matter; said bag further includes a maintainer for maintaining the meshing in the rolled-up position by fastening one position of the meshing to another portion of the meshing; and a shutter for closing the other extremity of the tube by fastening one position of the meshing to another portion of the meshing.

10. Method according to claim 9, which comprises, prior to the grinding step, a step of sucking up plants.

11. Method according to claim 9, which comprises a step of sectioning stems of plants to be ground.

12. Device for dredging a watercourse or body of water, comprising:

a watercraft which supports a grinder;

the grinder for grinding plants found in the watercourse or body of water comprising an inlet for plants and an outlet for ground plants; and a floating bag connected to the outlet of the grinder in order to collect scraps of ground plants;

wherein said floating bag includes a meshing made of geotextile for holding the plant matter, the meshing presenting a rectangular shape and being configured to be rolled up to form a tube the axis of the tube being parallel to two sides or the rolled up rectangle comprising, at one extremity, an inlet for the plant matter; said bag further includes a maintainer for maintaining the meshing in the rolled-up position by fastening one position of the meshing to another portion of the meshing; and a shutter for closing the other extremity of the tube by fastening one position of the meshing to another portion of the meshing.

13. Device according to claim 12, which comprises an inlet for sucking up plants, configured to feed the inlet of the grinder with the plants sucked up.

14. Device according to claim 12, which comprises a sectioner, immersed in the watercourse or body of water, for sectioning stems of plants to be ground.

15. Device according to claim 12, which comprises a sterilizer for sterilizing seeds ground together with the plants and having passed through the grinder.

16. Device according to claim 12, wherein the bag made of geotextile comprises at least one portion made of vegetable fibers.

17. Device according to claim 16, wherein the bag comprises at least one portion made of non-woven hemp.

18. Device according to claim 12, which comprises a loosener for loosening sediment fixed to a side of the watercourse or body of water.

* * * * *